(12) United States Patent
Mizuno et al.

(10) Patent No.: US 11,173,853 B2
(45) Date of Patent: Nov. 16, 2021

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Hiroki Hirai, Mie (JP); Makoto Higashikozono, Mie (JP); Hidetoshi Ishida, Mie (JP); Masakuni Kasugai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/937,714

(22) Filed: Jul. 24, 2020

(65) Prior Publication Data

US 2020/0353880 A1 Nov. 12, 2020

Related U.S. Application Data

(63) Continuation of application No. 16/485,254, filed as application No. PCT/JP2018/003597 on Feb. 2, 2018, now Pat. No. 10,766,438.

(30) Foreign Application Priority Data

Feb. 23, 2017 (JP) .............................. JP2017-032137

(51) Int. Cl.
B60R 16/02 (2006.01)

(52) U.S. Cl.
CPC ................................ *B60R 16/0215* (2013.01)

(58) Field of Classification Search
CPC ................................................. B60R 16/0215
(Continued)

(56) References Cited

U.S. PATENT DOCUMENTS 4,918,261 A 4/1990 Takahashi et al.
2002/0062979 A1* 5/2002 Murakami ........... H01B 7/0861
174/117 F
(Continued)

FOREIGN PATENT DOCUMENTS

JP 58-192408 12/1983
JP 2015-072798 4/2015

OTHER PUBLICATIONS

International Search Report issued in International Bureau of WIPO Patent Application No. PCT/JP2018/003597, dated Feb. 27, 2018.

*Primary Examiner* — Stanley Tso
(74) *Attorney, Agent, or Firm* — Greenblum & Bernstein, P.L.C.

(57) ABSTRACT

To provide a technique for enabling a single exterior member to be easily used for both a region of a wire harness that is disposed in a flat state and a region thereof that is disposed in a bent state. The wire harness includes an exterior member formed in a sheet shape, and a wire disposed overlapping the exterior member in at least a partial region extending along an extension direction of the wire. At least a part of a portion where an insulating covering of the wire and the exterior member overlap is welded. A partial region of the exterior member that extends along the extension direction of the wire is in a flat state, and at least another partial region of the exterior member that extends along the extension direction of the wire is rolled up in a direction intersecting the extension direction of the wire.

17 Claims, 3 Drawing Sheets

(58) Field of Classification Search
USPC .................................................... 174/72 A
See application file for complete search history.

(56) References Cited

U.S. PATENT DOCUMENTS

| | | |
|---|---|---|
| 2014/0255627 A1 | 9/2014 | Yamaguchi et al. |
| 2015/0048221 A1* | 2/2015 | Doushita ............... H02G 3/04 |
| | | 248/71 |
| 2015/0321625 A1 | 11/2015 | Sato et al. |
| 2015/0329069 A1 | 11/2015 | Daugherty et al. |
| 2016/0019998 A1* | 1/2016 | Kawaguchi ...... H01B 13/01281 |
| | | 174/72 A |

* cited by examiner

WIRE HARNESS

CROSS REFERENCE TO RELATED APPLICATIONS

The present application is a continuation of U.S. patent application Ser. No. 16/485,254, filed Aug. 12, 2019, which is a National Phase application of International Application No. PCT/JP2018/003597, filed Feb. 2, 2018, which claims the benefit of Japanese Patent Application No. 2017-032137, filed Feb. 23, 2017. The disclosures of each of the above-noted applications are expressly incorporated herein by reference in their entireties.

TECHNICAL FIELD

The present invention relates to a technique for attaching an exterior member to a wire in a vehicle wire harness.

BACKGROUND ART

Patent Document 1 discloses a technique for positioning a sheet-shaped exterior member relative to a wire by wrapping tape around each end of the exterior member and a portion of the wire that extends from the ends when attaching the exterior member to the wire.

CITATION LIST

Patent Documents

Patent Document 1: JP 2015-72798A

SUMMARY OF INVENTION

Technical Problem

Some wire harnesses include a region that is disposed in a flat state and a region that is disposed in a bent state. In this case, if separate exterior members are attached to the region disposed in a flat state and the region disposed in a bent state, problems such as an increased number of components arise. On the other hand, if a single exterior member of a molded article is to be used for the region disposed in a flat state and the region disposed in a bent state, problems such as an increase in the complexity of the shape of the exterior member arise.

Therefore, it is an object of the present invention to provide a technique for enabling a single exterior member to be easily used for both a region of a wire harness that is disposed in a flat state and a region thereof that is disposed in a bent state.

Solution to Problem

To solve the above-described problems, a wire harness according to a first aspect includes: an exterior member formed in a sheet shape; and a wire disposed overlapping the exterior member in at least a partial region extending along an extension direction of the wire, wherein at least a part of a portion where an insulating covering of the wire and the exterior member overlap is welded, and a partial region of the exterior member that extends along the extension direction of the wire is in a flat state, and at least another partial region of the exterior member that extends along the extension direction of the wire is rolled up in a direction intersecting the extension direction of the wire.

A wire harness according to a second aspect is the wire harness according to the first aspect, wherein at least a part of the portion where the insulating covering of the wire and the exterior member overlap is ultrasonically welded.

A wire harness according to a third aspect is the wire harness according to the first or second aspect, wherein the exterior member is gradually rolled up from the region of the exterior member that is in a flat state toward the rolled-up region.

A wire harness according to a fourth aspect is the wire harness according to the first or second aspect, wherein a slit extending from an inner portion of the exterior member to an outer edge of the exterior member is formed at a boundary between the region that is in a flat state and the rolled-up region of the exterior member.

A wire harness according to a fifth aspect is the wire harness according to any one of the first to fourth aspects, wherein a fixation member for fixing the wire to an attachment target is welded to the exterior member.

A wire harness according to a sixth aspect is the wire harness according to the fifth aspect, wherein the exterior member is maintained in a rolled-up state by the fixation member provided in the rolled-up region of the exterior member.

A wire harness according to a seventh aspect is the wire harness according to any one of the first to sixth aspects, wherein a portion where the exterior member is at least double-layered with a surface thereof on which the wire is disposed located on an inner circumferential side thereof is present in the rolled-up region of the exterior member.

Advantageous Effects of Invention

According to the first to seventh aspects, the wire and the exterior member are welded together, and, therefore, the exterior member can be easily rolled up also in a direction intersecting the extension direction of the wire. Also, the portion of the exterior member that is rolled up in the direction intersecting the extension direction of the wire has an increased degree of freedom in the bending direction as compared with the flat portion. This enables a single exterior member to be easily used for both the region of the wire harness that is disposed in a flat state, and the region thereof that is disposed in a bent state.

According to the second aspect in particular, welding can be easily achieved.

According to the third aspect in particular, the exterior member can be rolled up without providing a slit.

According to the fourth aspect in particular, the rolled-up region can be more easily rolled up in a compact manner.

According to the fifth aspect in particular, the fixation member can be readily attached.

According to the sixth aspect in particular, the exterior member can be readily maintained in a rolled-up state.

According to the seventh aspect in particular, the entire circumference of the wire can be covered by the exterior member.

DESCRIPTION OF EMBODIMENTS

Embodiment

Figure 1:
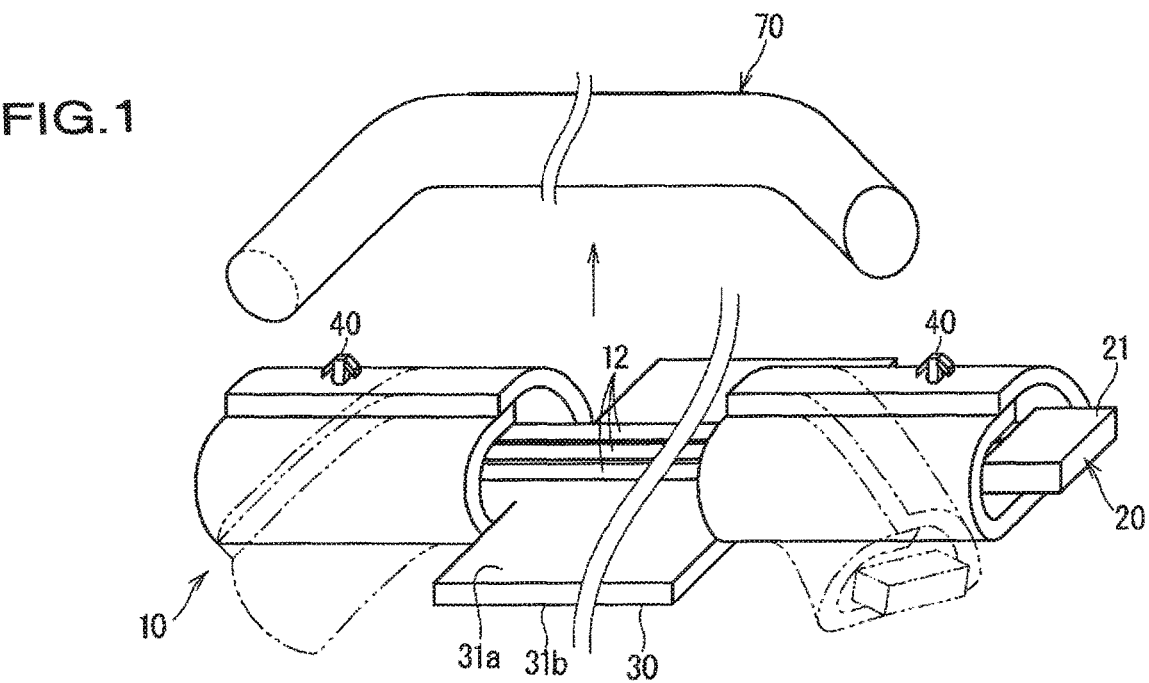
FIG. 1 is a perspective view showing a wire harness according to an embodiment.
Figure 2:
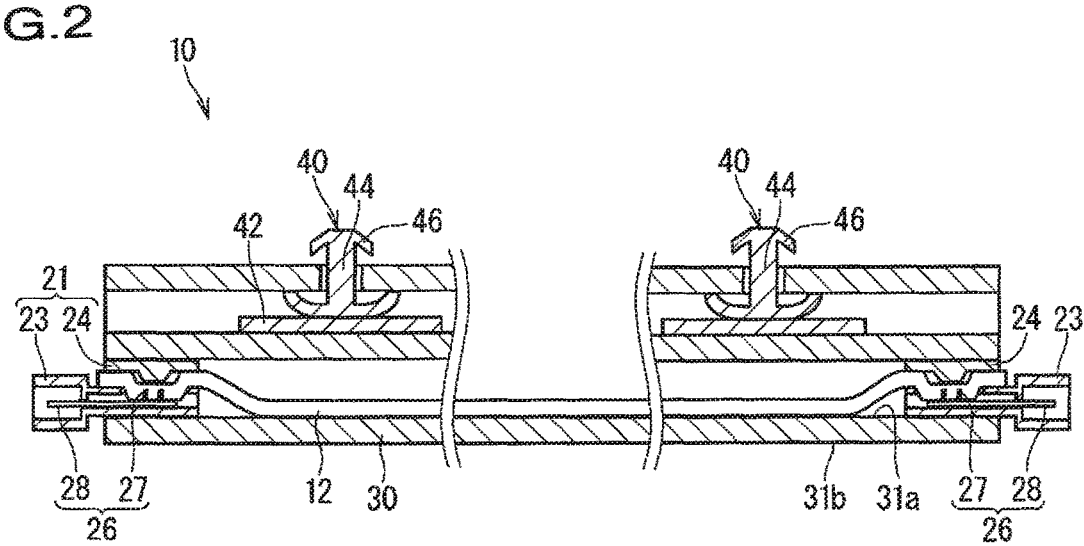
FIG. 2 is a schematic cross-sectional view showing the wire harness according to the embodiment.
Figure 3:
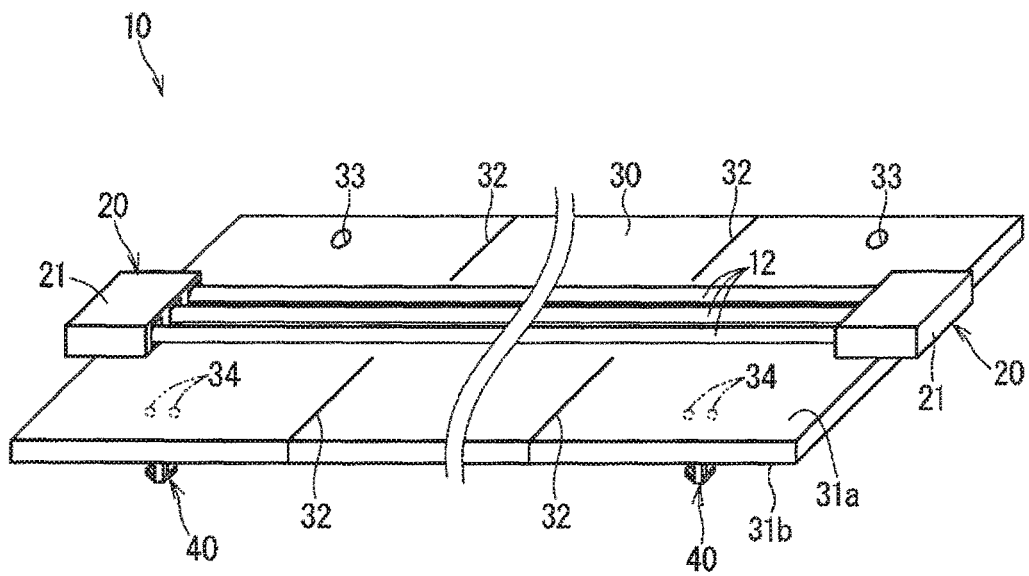
FIG. 3 is a perspective view showing a state before rolling an exterior member.
Figure 4:
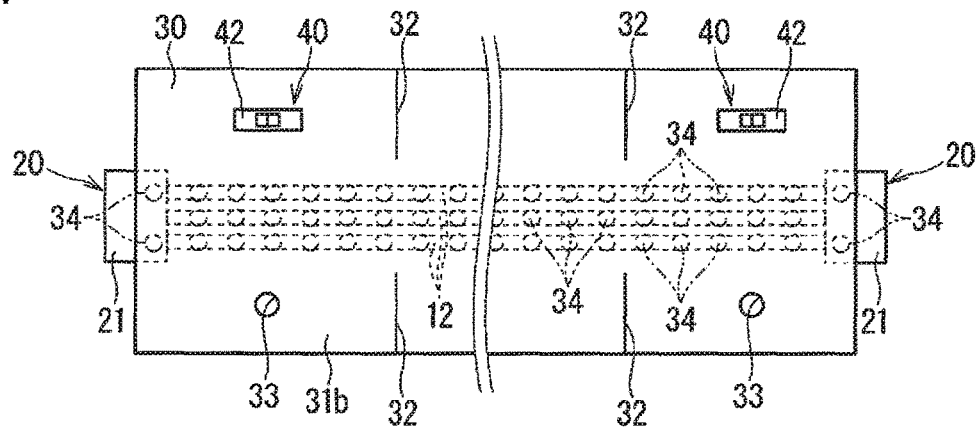
FIG. 4 is a bottom view shown the state before rolling the exterior member.

In the following, a wire harness according to an embodiment will be described. FIG. 1 is a perspective view showing a wire harness 10 according to this embodiment. FIG. 2 is a schematic cross-sectional view showing the wire harness 10 according to this embodiment. FIG. 3 is a perspective view showing a state before rolling an exterior member 30. FIG. 4 is a bottom view showing the state before rolling the exterior member 30.

The wire harness 10 is used as wiring that electrically connects various electric devices mounted in a vehicle or the like to each other. Here, it is assumed that the wire harness 10 is routed around, for example, an instrument panel in a vehicle. Of course, the routing location of the wire harness 10 in the vehicle is not limited to the above-described location, and the wire harness 10 may also be routed around a roof, a door, or the like. Specifically, the wire harness 10 includes an exterior member 30 and a wire 12. The wire harness 10 further includes a connector 20 and a fixation member 40.

Here, it is assumed that the wire harness 10 is routed along a bar-shaped member 70. In the example shown in FIG. 1, the bar-shaped member 70 is a member extending in three dimensions. Although the bar-shaped member 70 is formed in a cross-sectionally circular shape in the example shown in FIG. 1, this is not essential; the bar-shaped member 70 may also have a square shape or the like. Such a bar-shaped member 70 can be, for example, a member called a reinforcement. When the wire harness 10 is caused to extend along the bar-shaped member 70, the wire harness 10 is also bent in three dimensions. Here, around the above-described instrument panel, the routing space for the wire harness 10 is narrow, and there may be locations where the exterior member 30 to be attached to the wire harness 10 needs to have a flat shape. On the other hand, when the exterior member 30 attached to the wire harness 10 has a flat shape, it is difficult to bend the wire harness 10 in the flat surface, making it difficult to cause the wire harness 10 to extend along the bar-shaped member 70 extending in three dimensions. Accordingly, for the wire harness 10 according to the present invention, a partial region of the exterior member 30 is formed in a flat shape, and another partial region thereof is formed in a shape that can be easily bent.

The exterior member 30 is formed in a sheet shape. In the example shown in FIG. 1, the exterior member 30 is formed in a rectangular sheet shape. However, the shape of the exterior member 30 is not limited to the one described above, and may be changed as appropriate according to the placement configuration or the like of the wire 12. The exterior member 30 is a member that is externally mounted to the wire 12. The exterior member 30 is a member having at least one function of soundproofing the wire 12 (muffling, sound absorption, sound insulation, etc.), protecting the wire 12 (wear resistance, tensile resistance, penetration resistance, etc.), dissipating heat from the wire 12, shielding the wire 12, and waterproofing the wire 12. The function of the exterior member 30 can be appropriately selected according to the properties of the wire 12 and the environment or the like of the location where the wire 12 is disposed, for example. Here, the description is given for an example in which the exterior member 30 is a protective sheet with abrasion resistance since the wire 12 is disposed in a location where it may be rubbed against surrounding members.

Such a protective sheet is formed of a sheet material such as a non-woven fabric of PVC (polyvinyl chloride), PE (polyethylene), and PP (polypropylene). When the protective sheet is formed of a non-woven fabric, the protective sheet may be hot-pressed, for example. Alternatively, the protective sheet may be formed by subjecting a spunbonded non-woven fabric or the like to embossing or the like. This can make the protective sheet hard. The abrasion resistance of such a protective sheet may be derived from the physical properties of its structure, or may be derived from the physical properties of its material. For example, the protective sheet is formed flat in the example shown in FIG. 1, and it seems that the abrasion resistance of the protective sheet can be increased by adopting a configuration in which irregularities are formed on the outer surface of this protective sheet. Also, it seems that the protective sheet can be made hard, for example, by adopting a configuration in which the non-woven fabric is hot-pressed as described above, thus increasing its abrasion resistance. Also, it seems that the abrasion resistance can be increased, for example, by adopting a hard material as the material that forms the protective sheet.

As described above, the exterior member 30 is flat in a partial region, and is rolled up in at least another partial region. In the example shown in FIG. 1, opposite ends along the extension direction of the wire 12 are rolled up, and a region located therebetween is formed flat. Of course, the ends along the extension direction of the wire 12 may be formed as flat regions, and a rolled-up region may be present between the flat regions. Alternatively, one end along the extension direction of the wire 12 may be formed as a flat region, and the other end may also be formed as a rolled-up region. Alternatively, a larger number of flat regions and rolled-up regions than those shown in the drawing may be arranged.

In the rolled-up region of the exterior member 30, the exterior member 30 is at least double-layered (overlapping) with one principal surface 31a located on the inner circumferential side. This allows the exterior member 30 to cover the entire circumference of the wire 12. However, the exterior member 30 may be rolled up with the other principal surface 31b located on the inner circumferential side. Alternatively, the exterior member 30 does not need to be double-layered.

Here, slits 32 extending from an inner portion (the inner side portion as viewed in the direction of the normal of the principal surface 31a) of the exterior member 30 to an outer edge of the exterior member 30 are formed at the boundary between the region that is in a flat state and the rolled-up region of the exterior member 30. Although these slits 32 are formed along a direction orthogonal to the extension direction of the wire 12 in the example in FIG. 1, the slit 32 is not limited thereto. Although these slits 32 are formed as cuts having no width in the example shown in FIG. 1, the slits 32 may also be formed as recesses having a certain width.

The wire 12 is disposed so as to overlap the exterior member 30 in at least a partial region extending along the longitudinal direction. Although the wire 12 is disposed on only one principal surface 31a side of the exterior member 30 in the example shown in FIG. 1, the wire 12 may be transferred to the other principal surface 31b side midway. At least one wire 12 may be included. Here, a plurality of wires 12 (three in the example shown in FIG. 1) are included. An insulated wire 12 including a core wire 14 and an insulating covering 16 that covers the core wire 14 (see FIG. 6) is used for each of the wires 12. The core wire 14 is made of a conductive material such as copper or aluminum. The core wire 14 may be a solid wire, or may be a stranded wire. The insulating covering 16 may be formed by extrusion-molding, for example, a resin such as PVC (polyvinyl chloride), PE (polyethylene) or PP (polypropylene) to the outer circumference of the core wire 14, or may be formed by baking a varnish or the like that has been applied to the outer circumference of the core wire 14.

At least a part of a portion where the insulating covering 16 of the wire 12 and the exterior member 30 overlap is welded. Consequently, the wire 12 and the exterior member 30 are fixed.

Figure 5:
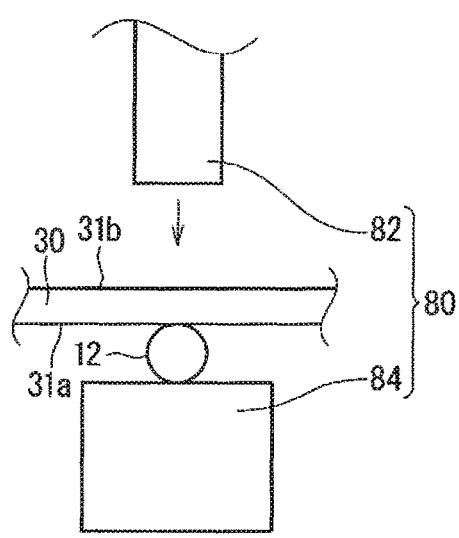
FIG. 5 is a diagram illustrating how ultrasonic welding is performed.

As the means for such welding, ultrasonic welding is adopted here. FIG. 5 is a diagram illustrating how ultrasonic welding is performed. As shown in FIG. 5, ultrasonic welding is generally performed while sandwiching two members to be welded (here, the wire 12 and the exterior member 30) between a horn 82 and an anvil 84 of an ultrasonic welder 80. The two members disposed between the horn 82 and the anvil 84 are brought into a state in which portions thereof that are to be welded abut against each other.

The horn 82 abuts against one of the two members, and applies ultrasonic vibrations to the one member. Examples of the transmitting mode of ultrasonic vibrations from the horn 82 include longitudinal vibration and transverse vibration, and the transmitting mode can be appropriately selected according to the shape, the physical properties, or the like of the members to be welded.

The anvil 84 supports the other of the two members. Although the wire supporting surface of the anvil 84 is formed as a flat surface in the example shown in FIG. 5, the wire supporting surface may also be formed as a curved surface.

Then, when ultrasonic vibrations are applied to the one member from the horn 82 in a state in which the two members to be welded are sandwiched between the horn 82 and the anvil 84, friction or compression or the like is caused by the applied ultrasonic vibrations, resulting in thermal energy. Consequently, a portion of the abutment surface is melted by the thermal energy, thus joining the two members. Note that only one of the two members may be melted, or both of the two members may be melted. It is considered that this is determined according to the physical properties or the like of the materials that form the two members.

In the case of performing ultrasonic welding, in general, marks formed as a result of the horn 82 having been pressed against (hereinafter referred to as "horn marks 34") may be left on the members. Therefore, the horn marks 34 may be left on the wire harness 10 as well. It is conceivable that such horn marks 34 may have, for example, a shape corresponding to the shape of irregularities formed on the horn 82.

The region of the wire 12 that is welded to the exterior member 30 in the longitudinal direction of the wire 12 may extend continuously as a string along the longitudinal direction of the wire 12 without being discontinued, or may include some discontinued sections along the longitudinal direction of the wire 12. In the example shown in FIG. 4, ultrasonic welding is intermittently performed such that some discontinued sections are included along the longitudinal direction of the wire 12. At this time, the range of one welding location, the interval between adjacent welding locations, or the like may be set as appropriate according to the joining strength or the like. Although ultrasonic welding is intermittently performed with a fixed pitch along the longitudinal direction of the wire 12 in the example shown in FIG. 4, there may be a portion where ultrasonic welding is performed with a different pitch.

The region of the wire 12 that is welded to the exterior member 30 in the circumferential direction of the wire 12 may be the whole region or a partial region along the circumferential direction. When a partial region of the wire 12 along the circumferential direction is welded, that region may be a region that is equal to or smaller than a half of the circumference, or may be a region that is equal to or smaller than a quarter of the circumference.

In performing ultrasonic welding, at least one of the two members (here, the insulating covering 16 of the wire 12 and the exterior member 30) contains a thermoplastic resin in the abutment surface. In this case, it is preferable that both of the two members contain a thermoplastic resin in the abutment surfaces, and that the melting points of the respective thermoplastic resins are at about the same level. Furthermore, it is preferable that both of the two members contain the same thermoplastic resin in the abutment surfaces. This allows both of the two members to be melted, thus making it possible to increase the joining strength.

As for the applications, such a wire 12 may be a power line, or may be a signal line. As for the thickness, the wire 12 may be thick, or may be thin. As for the cross-sectional shape, the wire 12 may be a round wire, or may be a square wire. Here, in general, at the start of ultrasonic welding, the abutment surfaces of the two members preferably have a convex shape in order to reduce the contact area. In this respect, it can be said that a round wire has a shape suitable for ultrasonic welding because it has a convex shape at every position in the circumferential direction and it is therefore not necessary to take its placement orientation into consideration.

Each end of the above-described wire 12 is incorporated into a connector 20. Then, in a state in which the wire harness 10 of the present embodiment is disposed at a placement target location in a vehicle or the like, the connectors 20 are connected to connectors 20 of various electric devices that are mounted in the vehicle or the like. Accordingly, the wire harness 10 of the present embodiment is used as wiring that electrically connects various electric devices mounted in the vehicle or the like to each other.

Here, the connectors 20 are also welded to the exterior member 30. A portion of the outer surface of the connector housing 21 of each connector 20 overlaps the exterior member 30, and at least a part of the overlapping portion is welded. The connector housing 21 is a member that has been molded in one piece (injection-molded) using a resin or the like as the material, for example. Although the horn marks 34 are left on the exterior member 30 side in the example shown in FIG. 4, the horn marks may be left on the connector housing 21 side.

Note that it is preferable that the welding location of the connector housing 21 is a location that does not impede fitting to the counterpart connector. For example, although a portion around the portion of each connector housing 21 from which the wires 12 extends to the outside is welded in the example shown in FIG. 4, a protruding piece may be formed by causing a portion of the outer surface of the connector housing 21 to protrude, and the protruding piece may be welded.

However, it is not essential that the connectors 20 are welded to the exterior member 30. In this case, the connectors 20 may also be fixed to the exterior member 30 with another means such as adhesive tape or an adhesive, or are not fixed to the exterior member 30 at all.

Here, as shown in FIG. 2, pressure-welding type connectors 20 are adopted as the connectors 20. More specifically, each connector housing 21 is made up of a first member 23, and a second member 24 that can be combined with the first member 23. The first member 23 is capable of holding a pressure-welding terminal 26 such that a pressure-welding portion 27 of the pressure-welding terminal 26 that can be pressure-welded to the insulated wire 12 is exposed to the outside. Also, the first member 23 houses a counterpart connection portion 28 of the pressure-welding terminal 26 that is connected to the counter part conductor such that the counterpart connection portion 28 can be connected to the counterpart conductor. The second member 24 is disposed opposite to the portion of the first member 23 that holds the pressure-welding portion 27, and is capable of pressing the insulated wire 12 toward the pressure-welding portion 27. Then, by pressing the insulated wire 12 toward the pressure-welding portion 27 by the second member 24, without the insulated wire 12 being stripped off, in a state in which the insulated wire 12 is positioned on the pressure-welding portion 27 of the pressure-welding terminal 26 held by the first member 23, a part of the pressure-welding portion 27 penetrates through the insulating covering 16 of the insulated wire 12 so as to abut against the core wire 14, and is connected thereto.

Here, in the example shown in FIG. 4, all the three wires 12 are welded to the exterior member 30. However, when the wire harness 10 includes a plurality of wires 12, a wire 12 that is not welded to the exterior member 30 may also be included. In the example shown in FIG. 4, all the three wires 12 are welded in the same manner. However, when the wire harness 10 includes a plurality of wires 12 that are welded to the exterior member 30, at least a part of the welding mode such as welding means or welding regions may be different among the wires.

In the example shown in FIG. 4, all the three wires 12 are connected to the same connector 20. However, when the wire harness 10 includes a plurality of wires 12, a wire 12 that is connected to a different connector 20 may be included.

In the example shown in FIG. 4, the wires 12 are disposed linearly. However, the wires 12 may also be disposed in a bent state. Then, when the wire harness 10 includes a plurality of wires 12, a wire 12 that is disposed linearly and a wire 12 disposed in a bent state may both be present. In this case, a branch may be formed in the plurality of wires 12 on the exterior member 30.

In the example shown in FIG. 4, the wires 12 are disposed at positions close to the center in the width direction relative to the exterior member 30. However, the path along which the wires 12 are disposed relative to the exterior member 30 is not limited to the one described above. For example, the wires 12 may be disposed at positions toward an end in the width direction relative to the exterior member 30. For example, the wires 12 may extend obliquely relative to the exterior member 30.

Each fixation member 40 is a member for fixing the wires 12 to an attachment target such as a vehicle body panel or the bar-shaped member 70, etc. Here, the fixation member 40 is also welded to the exterior member 30. Although the horn marks 34 are left on the exterior member 30 side in the example shown in FIG. 3, the horn marks may be left on the fixation member 40 side. Here, the fixation member 40 includes a column portion 44, and a blade portion 46 extending from a distal end of the column portion 44, and is called a clamp or a clip that has been molded in one piece (injection-molded) using a resin or the like as the material.

The fixation member 40 is provided with a plate portion 42 that supports the column portion 44, and the plate portion 42 and the exterior member 30 are welded together. As the plate portion 42, an existing component such as a protruding piece to be tape-wrapped of a so-called tape clamp, or a dedicated component may be newly provided.

In the example shown in FIG. 1, the fixation member 40 is attached protruding from the other principal surface 31b side opposite from the one principal surface 31a on which the wires 12 are disposed. The fixation member 40 is provided at a portion where ends of the exterior member 30 are to overlap in two layers in a region that is to be rolled up. Accordingly, as shown in FIG. 2, when the exterior member 30 is rolled up so as to surround the wires 12, the rolled-up state can be maintained by passing the fixation member 40 through the portion of the exterior member 30 that overlaps the fixation member 40. As shown in FIG. 3, in the region of the exterior member 30 that is to be rolled up, a through hole 33 is preferably formed in a portion where each fixation member 40 is provided when the exterior member 30 is rolled up. This facilitates passage of the fixation member 40 through the portion that overlaps the fixation member 40. However, the fixation member 40 may be attached protruding from the one principal surface 31a side. Alternatively, the fixation member 40 may be provided in the flat region.

With the wire harness 10 configured in the above-described manner, the wires 12 and the exterior member 30 are welded together, and, therefore, the exterior member 30 can be easily rolled up also in a direction intersecting the extension direction of the wires 12. Then, the portion of the exterior member 30 that is rolled up in a direction intersecting the extension direction of the wires 12 has an increased degree of freedom in the bending direction as compared with the flat portion. Accordingly, a single exterior member 30 can be easily used for both of the region of the wire harness 10 that is disposed in a flat state and the region thereof that is disposed in a bent state.

Since at least a part of the portion of the wire 12 where the insulating covering 16 and the exterior member 30 overlap is ultrasonically welded, welding can be easily achieved.

Since the slits 32 extending from an inner portion of the exterior member 30 to an outer edge of the exterior member 30 are formed at the boundary between the region that is in a flat state and the rolled-up region of the exterior member 30, the rolled-up region can be more easily rolled up in a compact manner. Furthermore, the region in a flat state is prevented from being rolled up.

Since the fixation member 40 for fixing the wire 12 to an attachment target is welded to the exterior member 30, the fixation member 40 can be readily attached.

Since the exterior member 30 is maintained in a rolled-up state by the fixation member 40 provided in the rolled-up region of the exterior member 30, the exterior member 30 can be readily maintained in a rolled-up state.

Since a portion where the exterior member 30 is at least double-layered with the one principal surface 31a on which the wire 12 is disposed located on the inner circumferential side is present in the rolled-up region of the exterior member 30, the entire circumference of the wire 12 can be covered by the exterior member 30.

Modification

Figure 6:
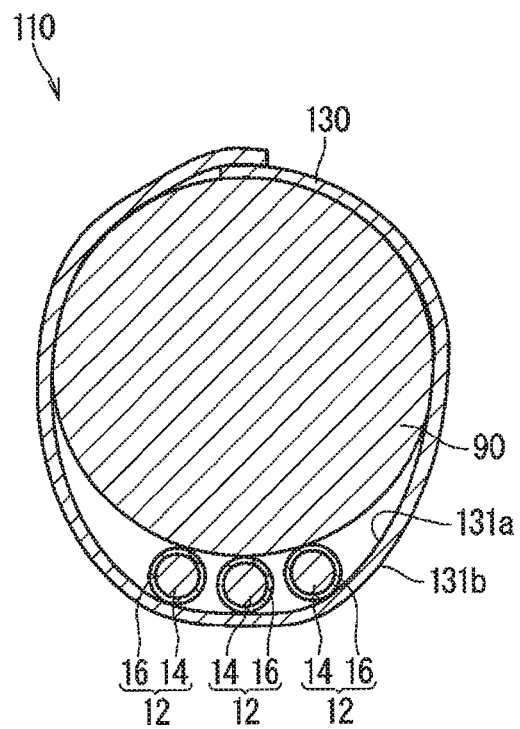
FIG. 6 is a schematic cross-sectional view showing a modification of the wire harness.

FIG. 6 is a schematic cross-sectional view showing a modification of the wire harness 10.

A wire harness 110 according to the modification is different from the wire harness 10 according to the embodiment in that a portion of the exterior member 130 in the width direction is wrapped around a bar-shaped member 90.

Although one principal surface 131a of the exterior member 130 on which the wires 12 are disposed faces the bar-shaped member 90 side in the example shown in FIG. 6, this is not essential, and the other principal surface 131b side may face the bar-shaped member 90 side.

Figure 7:
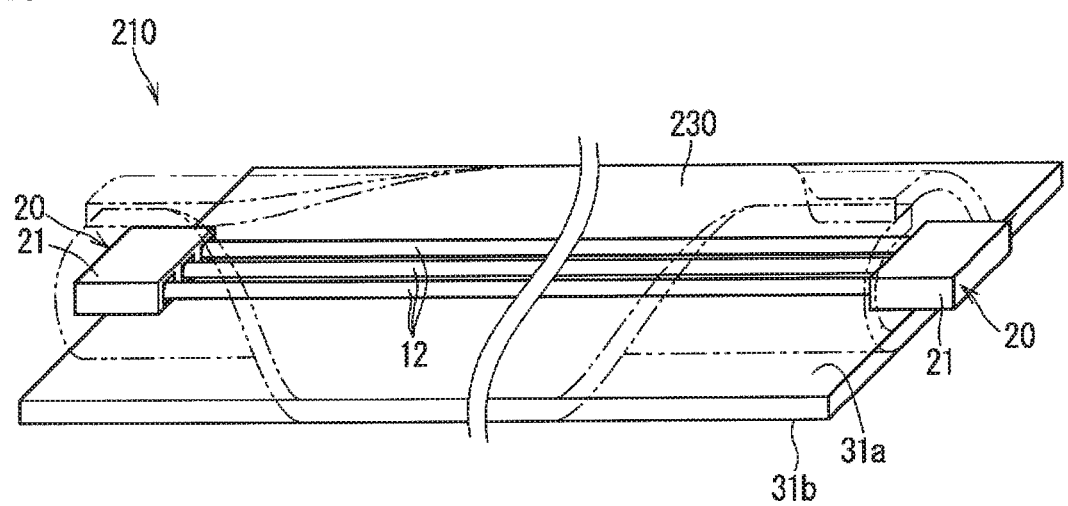
FIG. 7 is a schematic perspective view showing another modification of the wire harness.

FIG. 7 is a schematic perspective view showing another modification of the wire harness 10.

A wire harness 210 according to the modification is different from the wire harness 10 according to the embodiment in that an exterior member 230 is provided with no slit 32.

When such an exterior member 230 that is provided with no slit 32 is rolled up, the exterior member 230 is gradually rolled up from the region in a flat state toward the rolled-up region. Specifically, in the example shown in FIG. 7, looking at the wires 12 in a portion that is in a flat state, i.e., a portion located between a portion covering the wires 12 from one side and a portion completely covering around the wires 12 in a rolled-up region, the region covered by the exterior member 230 in the circumferential direction gradually changes in the longitudinal direction.

When no slit 32 is provided, the structure of the rolled-up portion is considered to be as follows. That is, a case can be considered where the portion completely covering around the wires 12 in the rolled-up region is a portion where which the radius of curvature is smallest in the exterior member 30, and toward that portion, the radius of curvature gradually decreases from the portion in a flat state. Alternatively, a case can also be considered where the radius of curvature is constant in the portion completely covering around the wires 12 in the rolled-up region, and a portion located in an intermediate portion leading thereto; however, the length of a bent portion of the exterior member 30 gradually increases toward the portion completely covering around the wires 12. Furthermore, a case can also be considered where both the radius of curvature and the length of the bent portion change.

Thus, it is possible to roll up a partial region of the exterior member 230, while maintaining another partial region thereof in a flat state, even when the exterior member 230 is provided with no slit 32. In this case, it is possible to save the time and effort in providing the slits 32.

Other Modifications

Although the wire harness 10 has been described as being routed along the bar-shaped member 70 in the embodiment, this is not essential. For example, it is also conceivable that the wire harness 10 is disposed along a plate-shaped member such as a vehicle body panel or a roof.

Although the welding means has been described as being ultrasonic welding thus far, the welding means is not limited to ultrasonic welding. For example, the welding means may also be heat welding such as resistance welding, or laser welding or the like.

Although the protective sheet has been described as having abrasion resistance, this is not essential. It is also conceivable that the protective sheet has penetration resistance. Although the exterior member 30 has been described as being a protective sheet in the embodiment, this is not essential. The exterior member 30 may also be a sound-proofing sheet, a shield member, or a heat dissipation member, or may function as a tension member.

Although the insulating covering 16 that covers immediately outside the core wire 14 of one wire 12 has been described as being directly welded to the exterior member 30 thus far, this is not essential. For example, it is also conceivable that, in a wire including a plurality of insulating coverings, such as one shield wire including a core wire, a first insulating covering that covers the core wire, a shielding layer that covers the first insulating covering, and a second insulating covering that covers the shielding layer, the outermost insulating covering and the exterior member 30 are welded together. For example, it is also conceivable that, in a cable including a plurality of wires 12, and a sheath that covers around the plurality of wires 12, the sheath and the exterior member are welded together. In this case, the sheath can be considered as one insulating covering of the wires 12.

Although the pressure-welding connector 20 has been described as being used as the connector 20 thus far, this is not essential. For example, it is also possible to use a connector that houses a crimped terminal that has been crimped to an end of each wire 12.

The configurations described in the embodiment and the modifications may be combined as appropriate as long as there are no mutual inconsistencies. For example, it is conceivable that the exterior member 30 is formed by a combination of a plurality of sheet materials having separate functions.

Although the present invention has been described above in detail, the foregoing description is in all aspects illustrative and the invention is not limited thereto. It will be appreciated that numerous modifications not illustrated herein can be made without departing from the scope of the present invention.

LIST OF REFERENCE NUMERALS

10 Wire harness
12 Wire
14 Core wire
16 Insulating covering
20 Connector
21 Connector housing
23 First member
24 Second member
26 Pressure-welding terminal
27 Pressure-welding portion
28 Counterpart connection portion
30 Exterior member
31a One principal surface
31b The other principal surface
32 Slit
34 Horn mark
40 Fixation member
42 Plate portion
44 Column portion
46 Blade portion
80 Ultrasonic welder
82 Horn
84 Anvil

What is claimed is:

1. A wire harness comprising:
an exterior member formed in a sheet shape;
a wire disposed overlapping the exterior member in at least a partial region extending along an extension direction of the wire,
wherein at least a part of a portion where an insulating covering of the wire and the exterior member overlap is welded, the exterior member includes a flat region and a rolled-up region, the flat region of the exterior member that extends along the extension direction of the wire is in a flat condition, and the rolled-up region of the exterior member that extends along the extension direction of the wire is rolled up in a direction intersecting the extension direction of the wire, the flat region and the rolled-up region are disposed at different positions from each other in the extension direction of the wire, and a portion of the exterior member in a width direction wraps around at least a portion of a bar-shaped reinforcement together with the wire, the width direction being perpendicular to the extension direction, the bar-shaped reinforcement being an attachment target along which the wire harness is routed, wherein a cross-section area of the bar-shaped reinforcement is greater than a cross-section area of the wire, the rolled-up region includes a completely rolled-up region where ends of the exterior member in the width direction are joined together, and the rolled-up region further includes a partially rolled-up region between the flat region and the completely rolled-up region in the extension direction, and a radius of curvature in the partially rolled-up region decreases as the partially rolled-up region extends further from the flat region toward the completely rolled-up region in the extension direction.

2. The wire harness according to claim 1,
wherein at least a part of the portion where the insulating covering of the wire and the exterior member overlap is ultrasonically welded.

3. The wire harness according to claim 1,
wherein the exterior member is continuously rolled up from the flat region of the exterior member toward the rolled-up region of the exterior member.

4. The wire harness according to claim 1,
wherein a slit extending from an inner portion of the exterior member to an outer edge of the exterior member is formed at a boundary between the flat region and the rolled-up region of the exterior member.

5. The wire harness according to claim 1,
wherein a fixation member for fixing the wire to the attachment target is welded to the exterior member.

6. The wire harness according to claim 5,
wherein the exterior member is maintained in a rolled-up condition by the fixation member provided in the rolled-up region of the exterior member.

7. The wire harness according to claim 1,
wherein a portion where the exterior member is at least double-layered with a surface of the exterior member on which the wire is disposed located on an inner circumferential side of the exterior member is present in the rolled-up region of the exterior member.

8. The wire harness according to claim 1,
wherein the wire is exposed outside the exterior member in the flat region.

9. The wire harness according to claim 1, wherein
the rolled-up region comprises a first rolled-up region and a second rolled-up region, and
the flat region is interposed between the first rolled-up region and the second rolled-up region in the extension direction of the wire.

10. The wire harness according to claim 9, wherein
the wire is exposed outside the exterior member in the flat region.

11. The wire harness according to claim 1, wherein
the rolled-up region is not provided at a position where the flat region is provided in the extension direction of the wire.

12. The wire harness according to claim 1, wherein an outer surface of the insulating covering of the wire contacts an outer surface of the bar-shaped reinforcement.

13. The wire harness according to claim 1, wherein
a circumferential rolled-up length in the width direction of the partially rolled-up region increases as the partially rolled-up region extends further from the flat region toward the completely rolled-up region in the extension direction.

14. The wire harness according to claim 1, further comprising a connector connected to the wire,
wherein the connector is disposed overlapping the rolled-up region of the exterior member, and is welded to the exterior member.

15. The wire harness according to claim 1, wherein the portion of the exterior member in the width direction completely wraps around the bar-shaped reinforcement together with the wire.

16. The wire harness according to claim 1,
wherein a fixation member for fixing the wire to the bar-shaped reinforcement is welded to the exterior member.

17. The wire harness according to claim 1,
wherein a fixation member for fixing the wire to a second attachment target other than the bar-shaped reinforcement is welded to the exterior member.

* * * * *